United States Patent [19]

Atkinson et al.

[11] 3,906,804

[45] Sept. 23, 1975

[54] SPEED CONTROL FOR AN ELECTROSTATICALLY SUPPORTED BALL GYROSCOPE

[75] Inventors: James L. Atkinson, La Mirada; Joseph C. Boltinghouse, Whittier, both of Calif.

[73] Assignee: Rockwell International Corporation, El Segundo, Calif.

[22] Filed: Dec. 20, 1973

[21] Appl. No.: 427,000

Related U.S. Application Data

[63] Continuation of Ser. No. 77,993, Oct. 5, 1970, abandoned.

[52] U.S. Cl.................................. 74/5.7; 74/5.6 D
[51] Int. Cl............................................. G06c 19/08
[58] Field of Search........ 74/5.7, 5, 5.6; 340/27 AT; 33/324, 327

[56] References Cited

UNITED STATES PATENTS

| | | | |
|---|---|---|---|
| 3,412,618 | 11/1968 | Staats | 74/5.7 |
| 3,482,455 | 12/1969 | Boltinghouse et al. | 74/5.6 |
| 3,545,287 | 12/1970 | Smith | 74/5.7 |
| 3,566,700 | 3/1971 | Staats | 74/5 |

Primary Examiner—Robert F. Stahl
Attorney, Agent, or Firm—H. Fredrick Hamann; Rolf M. Pitts; George Jameson

[57] ABSTRACT

The invention is directed to an electrostatically supported ball type gyroscope speed control system for maintaining the rotational speed of a ball, which is mass unbalanced about its spin axis, at a preselected speed.

The case enclosing the ball is provided with a set of electrostatic electrodes, arranged in three-dimensional space. Servo means are provided for generating a levitating electric field between the ball and the electrodes. The ball is constructed to be unbalanced about its spin axis so as to modulate the levitating electric field at the ball spin frequency. A sharply tuned phase lag circuit is interposed in the servo means to cause the levitating electric field to exert either an accelerating or a decelerating coupling force on the ball to bring the speed of the ball to the preselected value determined by the resonance or the phase lag circuit.

10 Claims, 19 Drawing Figures

INVENTORS
JAMES L. ATKINSON
JOSEPH C. BOLTINGHOUSE
BY
ATTORNEY

FIG. 6a  LEVITATION BIAS, 20KHz

FIG. 6b +SAMPLE CONTROL

FIG. 6c −SAMPLE CONTROL

FIG. 6d  PICKOFF SIGNAL WITH ROTOR ORBIT MODULATION (180° OUT OF PHASE WITH RESPECT TO ORBIT VECTOR)

FIG. 6e  SAMPLE & HOLD DEMODULATOR OUTPUT (LAGS ORBIT VECTOR BY 191°)

FIG. 6f  MUM OUTPUT (LAGS ORBIT VECTOR BY 11°)

*INVENTOR.*
JAMES L. ATKINSON
JOSEPH C. BOLTINGHOUSE

BY Edward Dugas

ATTORNEY

FIG. 10b  EQUILIBRIUM
2550 rps

FIG. 10c

INVENTORS
JAMES L. ATKINSON
JOSEPH C. BOLTINGHOUSE
BY
Edward Dugas
ATTORNEY

SPEED CONTROL FOR AN ELECTROSTATICALLY SUPPORTED BALL GYROSCOPE

This is a continuation of application Ser. No. 77,993 filed Oct. 5, 1970, now abandoned.

BACKGROUND OF THE INVENTION

The field of the invention is related to gyroscopes of the electrostatic levitation type which utilize a spinning ball whose center of mass is displaced from the spin axis of the ball and specifically to a means for controlling the speed of the spinning ball.

In U.S. Pat. application Ser. No. 47,506, entitled "Electrostatic Pickoff System for Ball Gyros of the Electrostatic Levitation Type," by J. C. Boltinghouse, et al, the co-inventors of the present application, there is disclosed an electrostatically supported ball gyroscope with an all-attitude pickoff in which the rotating ball in unbalanced with respect to the spin axis of the ball such that when the ball rotates it orbits. This causes the surface of the ball to advance and recede at the spin frequency with respect to any fixed point in a plane normal to the spin axis.

The ball is disposed within a spherical cavity defined by four pairs of diametrically opposed octantal electrodes. Circuit means are provided for each pair of electrodes so that upon departure of the ball from a centered position, the voltages across the gaps are respectively increased and decreased to urge the ball towards center. The effect of the ball unbalance is to modulate, at the spin frequency, the electrical fields between the ball and each electrode. Means are provided for interpreting the modulated signal so as to locate the spin axis of the ball accurately with respect to the gyroscope's case.

Ideally, a ball, once set spinning in a vacuum and in the presence of a negligible magnetic field, would spin indefinitely without acceleration. In practice, traces of gas, and stray magnetic fields may cause a slight deceleration over a period of weeks or months. It is, therefore, desirable to introduce sufficient spin force to the ball to make up for these losses.

It is appreciated that, given a perfectly spherical ball spinning about an axis through its center, the levitation means could apply no force in a sense to accelerate or decelerate the spin. However, if (as in the present invention) the ball is constructed to have appreciable mass unbalance laterally with respect to the spin axis, so that the ball orbits, a moment arm exists which makes possible the application of accelerating and decelerating forces from the levitation electrodes.

SUMMARY OF THE INVENTION

According to one aspect of the present invention, there is provided an electrostatically supported ball gyroscope, with the ball being unbalanced in a plane normal to the axis of spin so that when the ball spins, it orbits. The ball is disposed within a spherical cavity defined by pairs of diametrically opposed electrodes. Circuit means are provided for each pair of electrodes such that upon departure of the ball from a centered condition, the voltages across the gaps are respectively increased and decreased to urge the ball towards center. Each of the circuit means is provided with a sharply tuned phase lag circuit which causes a phase lag to occur between the position pickoff signal and the electrostatic force applied to the ball such that a coupling force is applied to the ball to either increase or decrease its rotation rate to a predetermined value for all attitudes of the axis of spin with respect to supporting electrodes.

It is, therefore, an object of the present invention to provide an apparatus for controlling the speed of an electrostatically supported rotating ball for all attitudes.

It is another object of the present invention to provide a speed control apparatus which utilizes substantially all of the electronics associated with already existing levitation apparatus.

It is another object of the present invention to provide a speed control for a ball type gyroscope rotor which speed control requires no external adjustments.

The foregoing objects of the present invention will become more apparent and better understood when taken in conjunction with the following description and accompanying drawings, throughout which like characters indicate like parts and which drawings form a part of this application.

DESCRIPTION OF THE PREFERRED EMBODIMENT

The levitation portion of this invention is identical to the levitation system disclosed in U.S. Pat. application, Ser. No. 47,506, entitled "Ball Gyros of Electrostatic Pickoff Type," filed June 18, 1970, by J. C. Boltinghouse and J. L. Atkinson, which application is assigned to North American Rockwell Corporation.

In order to achieve a complete understanding of the present invention, it will be necessary to set forth in detail portions of the referenced application.

Figure 1:
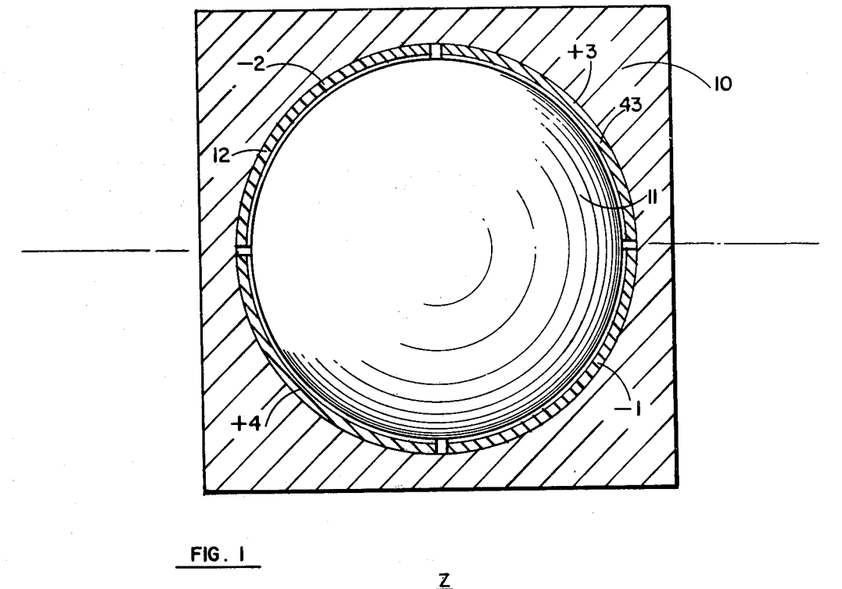
FIG. 1 illustrates in a sectioned view a spherical gyroscope rotor, positioned for levitation by a plurality of electrodes.
Figure 2:
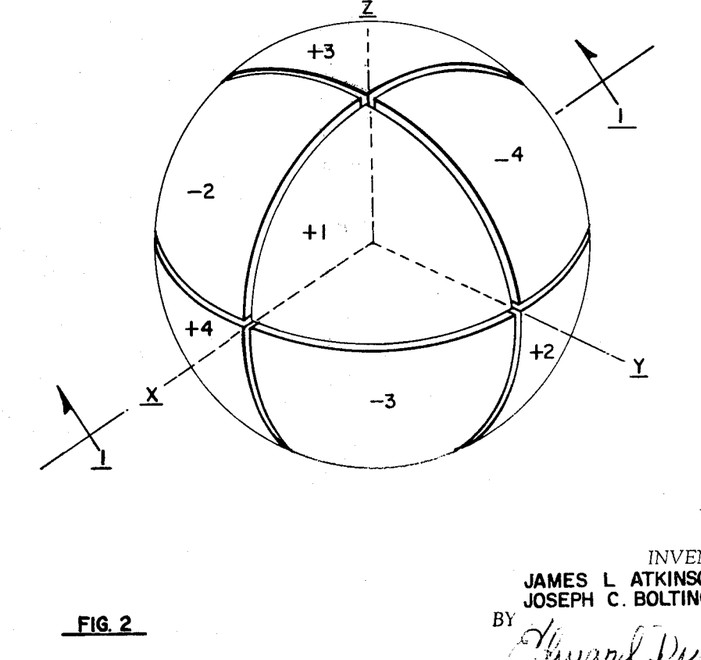
FIG. 2 illustrates an exploded view of the positioning and shaping of the levitating electrodes used in supporting the gyroscope rotor shown in FIG. 1.

FIGS. 1 and 2 show schematically a gyroscope comprising a nonconducting ceramic case 10 with a spherical internal contour and a conductivesurfaced spinning ball 11. Within the case is a spherical cavity 12 lined with eight octantal electrodes, shown, as seen from the outside, in FIG. 2, which are denoted, for convenience in analysis, as +1, −1, +2, −2, +3, −3, and +4, −4. Each pair, e.g., +1 and −1, are diametrically opposed. The electrode surfaces may be thought of as the projection, upon a sphere, of the eight faces of a regular octahedron. The axes of the electrode set are taken as $x$, $y$, $z$ in FIG. 2. The $x$ and $z$ axes define the plane along which a section is taken for FIG. 1. A vacuum exists within the spherical cavity 12.

Each pair of electrodes, e.g., +1, and −1, are connected into a levitating servo system, to be described, such that departure of the ball 11 from the center of the spherical cavity 12 which, for example, decreases the gap at +1 and increases it at −1, results in voltage decrease and increase respectively to center the ball. It will be noted that four non-orthogonal levitation channels are provided, the angle between any pair of channels being approximately 110°.

Figure 3:
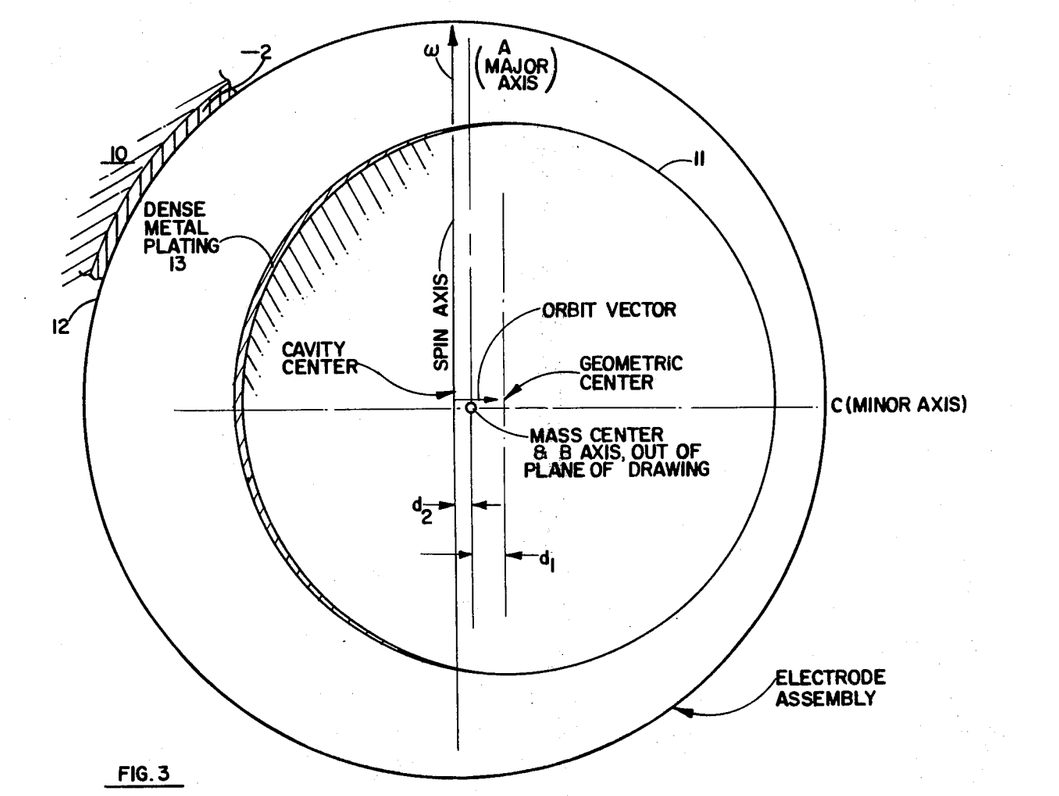
FIG. 3 is a schematic view of the gyroscope rotor constructed in accordance with the present invention.

FIG. 3 is a schematic central cross-section of the ball 11, which is typically a solid mass of beryllium or other low-density material, of the order of 0.4 inch in diameter. Its surface is ideally a true sphere. One side is provided with a very thin (typically 4 micro-inch) layer of a dense metal such as tantalum, as indicated at 13, which displaces the center of mass a distance $d_1$ of the order of 16 micro-inches away from the geometrical center, or about 5 percent of the typical 300 micro-inch gap, and the mass center a distance $d_2$ approximately .34 micro-inches from the cavity center. The dense metal layer establishes the C axis or the AB plane. In other words, it establishes an axis of major moment of inertia A, and two minor axes, B and C. The mass unbalance is almost entirely radial. This is important because unbalance along the spin axis is a source of error torque under the acceleration of gravity and inertial accelerations. Radial mass unbalance is not a source of error torque.

The ball typically spins at about 2,550 rps. A motor, not shown is provided for initially bringing the ball up to speed. The spin frequency is far above the servo natural frequency (typically about 800 Hz), therefore, the ball spins very nearly on the center of mass, the discrepancy, D, being of the order of 0.36 micro-inches. The geometrical center of the ball orbits in a circle typically of 16 to 20 micro-inches radius. (It will be appreciated that if the servo were infinitely stiff, the ball would spin about its geometrical center and the present pickoff system would not be applicable).

The invention is not dependent on use of any particular levitation circuit. A specific electrostatic levitation circuit will be described to complete the teaching of a preferred embodiment. The levitation circuit's function is to servo-control the voltages at the eight electrodes so as to keep the ball centered.

Primarily, it is pointed out that the force F exerted by an electrode on the ball is given by the expression:

$$F = k \left(\frac{voltage}{gap}\right)^2 \qquad \text{Equation (1)}$$

It can be shown that if (as is this case) only one frequency is involved in the levitation, the force exerted by one electrode is simply proportional to the current-squared supplied to the electrode, indepent of the gap; thus:

$$f = ki^2 \qquad \text{Equation (2)}$$

Figure 4:
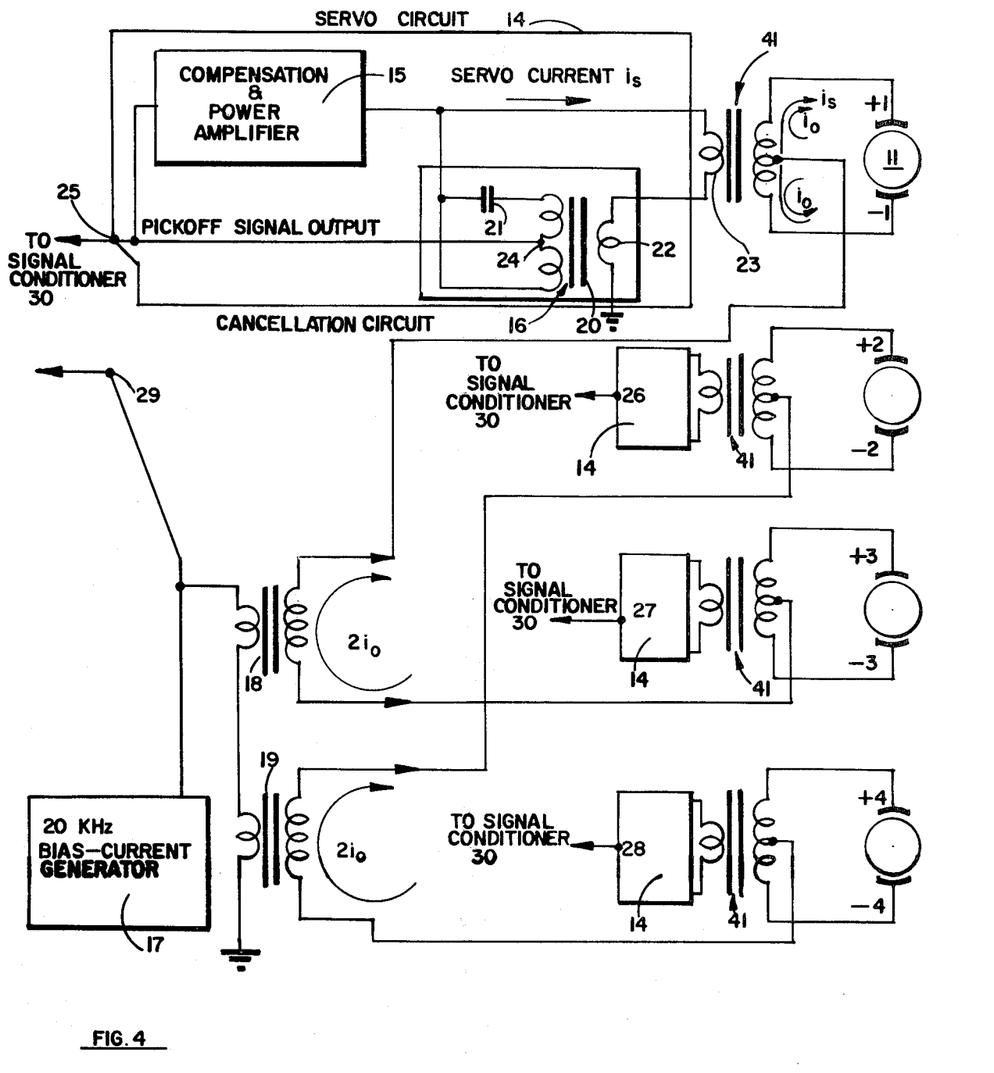
FIG. 4 is a diagram of the rotor levitation circuits.

Referring to FIG. 4, which shows a complete levitation circuit for one channel (electrodes +1, and −1), with the circuits for the other three channels being identical, a center-tapped transformer 41 couples the electrodes, +1 and −1, to a servo and speed control circuit 14, including a compensation and speed control means 15 and a cancellation circuit 16. A bis current generator 17 supplies, via transformers 18 and 19, a bias voltage at the center-tap of transformers 41 and to the compensation and speed control means 15.

The current supplied to the electrodes consists of two parts: a constant current $2i_o$, and a servo current $i_s$. The bias currents going into and out of the transformer 41 center-taps are equal regardless of this gyro rotor position. While it is not immediately obvious, it can be shown that each of these bias currents is divided into two equal parts $i_o$ by the high inductance of the transformers and, again, this effect is independent of the ball position. It follows that the net force exerted for one axis is given by:

$$F = k \left[ (i_o + i_s)^2 - (i_o - i_s)^2 \right] = 4k\, i_o i_s \qquad \text{Equation (3)}$$

The force along a levitation axis is then linearly proportional to the servo current, and can be made proportional to the pickoff signal. In typical cases the dé compliance of the servo levitation is of the order of a few micro-inches per g.

The levitation system derives its pickoff signal from the transformer winding 23. If the ball 11 is uncentered, the bias currents $i_o$ will produce a voltage across the transformer winding 23. This voltage is called the pickoff signal and will be proportional to the ball displacement from center. However, added to the pickoff signal will be another voltage due to the servo current $i_s$ coming from the power amplifier 15. The cancellation circuit 16 is required to eliminate servo contamination of the pickoff signal. The cancellation transformer 20 is wound on the same kind of core as transformer 41, and the windings 22, 23 and 24 all have the same number of turns. By properly adjusting the capacitance of capacitor 21, the servo current $i_s$ will encounter exactly the same impedance in flowing through winding 22 as it does through winding 23, and the voltages produced by the current across windings 22, 23, and 24 will all be identical. Winding 24 subtracts from the Pickoff signal output appears at terminals 25, 26, 27, and 28 (FIG. 4) and the bias. Current generator furnishes an output at terminal 29.

Figure 5:
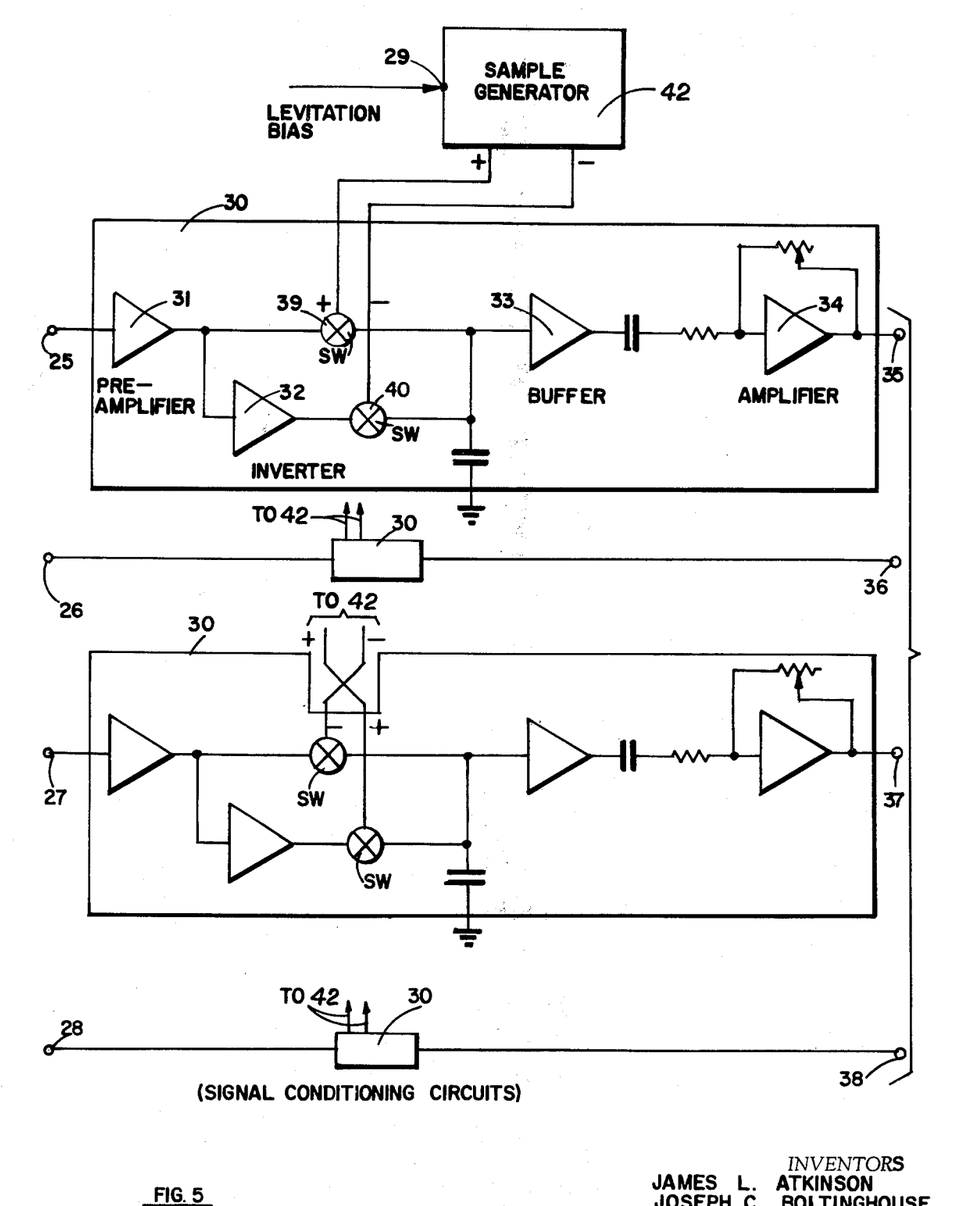
FIG. 5 is a diagram of a signal conditioning circuit.

The four pickoff signals are demodulated in what is termed a signal conditioner, which is shown in FIG. 5. It is comprised of four identical circuits 30 each having a preamplifier 31, an inverter 32, a buffer 33 and an adjustable gain amplifier 34. A sample generator 42 supplies pulse signals to the circuits via switches 39 and 40. The outputs of circuits 30 are called mass-unbalance modulation or MUM signals and appear at terminals 35, 36, 37 and 38. These signals are simply the modulation envelopes of the four pickoff signals.

Figure 6A:
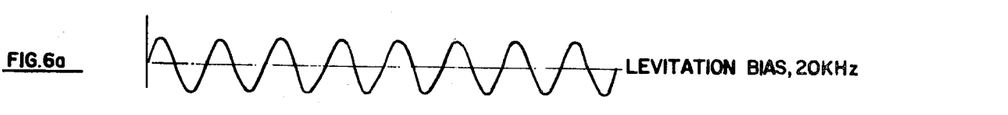
FIGS. 6a to 6f are diagrams showing the character of the signals at various points in the circuits of FIG. 5.
Figure 6B:
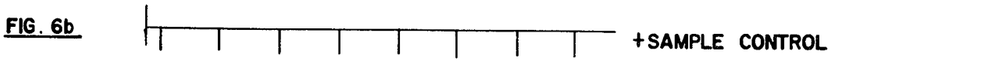
Figure 6C:
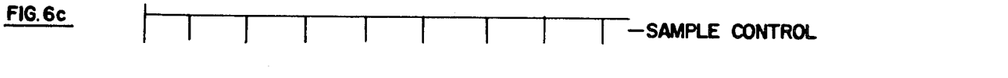
Figure 6D:
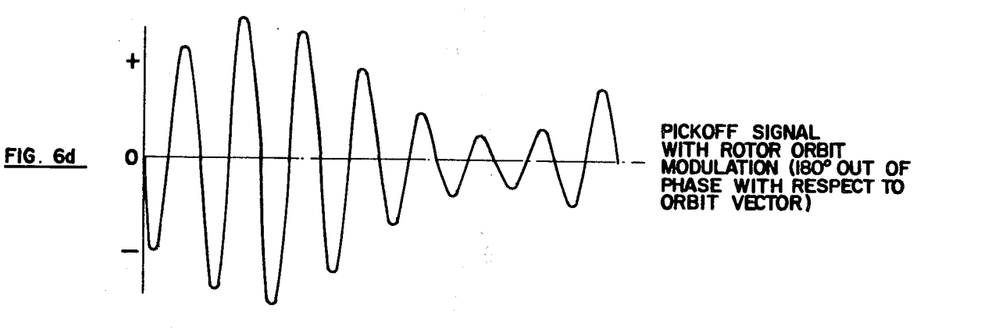

Referring to FIG. 6 which is a diagram showing the nature of the signals at the several parts of the circuit of FIG. 5, the pickoff signal (at input terminal 25) is shown as a modulated sine wave in FIG. 6d. FIG. 6a shows the levitation bias signal (20 KHz), and directly below, in FIGS. 6b and 6c, the corresponding output pulses from the sample generator 42.

Figure 6E:
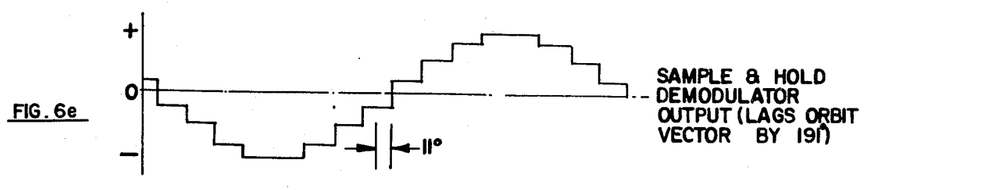
Figure 6F:
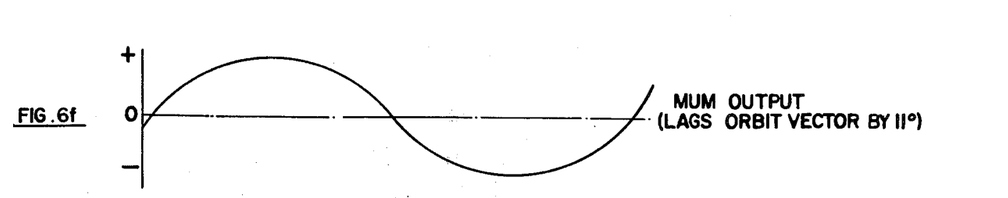

The sample-and-hold demodulated output (FIG. 6e) appears at the output of buffer 33, and is amplified and inverted at the amplifier 34 to produce the MUM signal (FIG. 6f) which, as stated, is simply the modulation envelope of the input signal. It is to be noted that the MUM signals typically lag the orbit vectors (of FIG. 3) by 11°. This is explained by the fact that the sample-and-hold technique produces a stair-step output. With 40,000 samples per second, the 2,550 Hz output lags one-half a step:

$$\text{Lag} = \frac{1}{2} \cdot \frac{2,550}{40,000} \cdot 360° = 11° \quad \text{Equation (4)}$$

The spin axis attitude information is contained in the relative phase and amplitude relationships of the four MUM signals appearing at terminals 35, 36, 37, and 38 in FIG. 5.

There are various ways in which such information can be processed to yield the desired information; namely the attitude of the spin axis of the ball relative to the case. The preferred embodiment for determining the spin axis attitude from the four MUM signals uses only their phase relationships.

Figure 7:
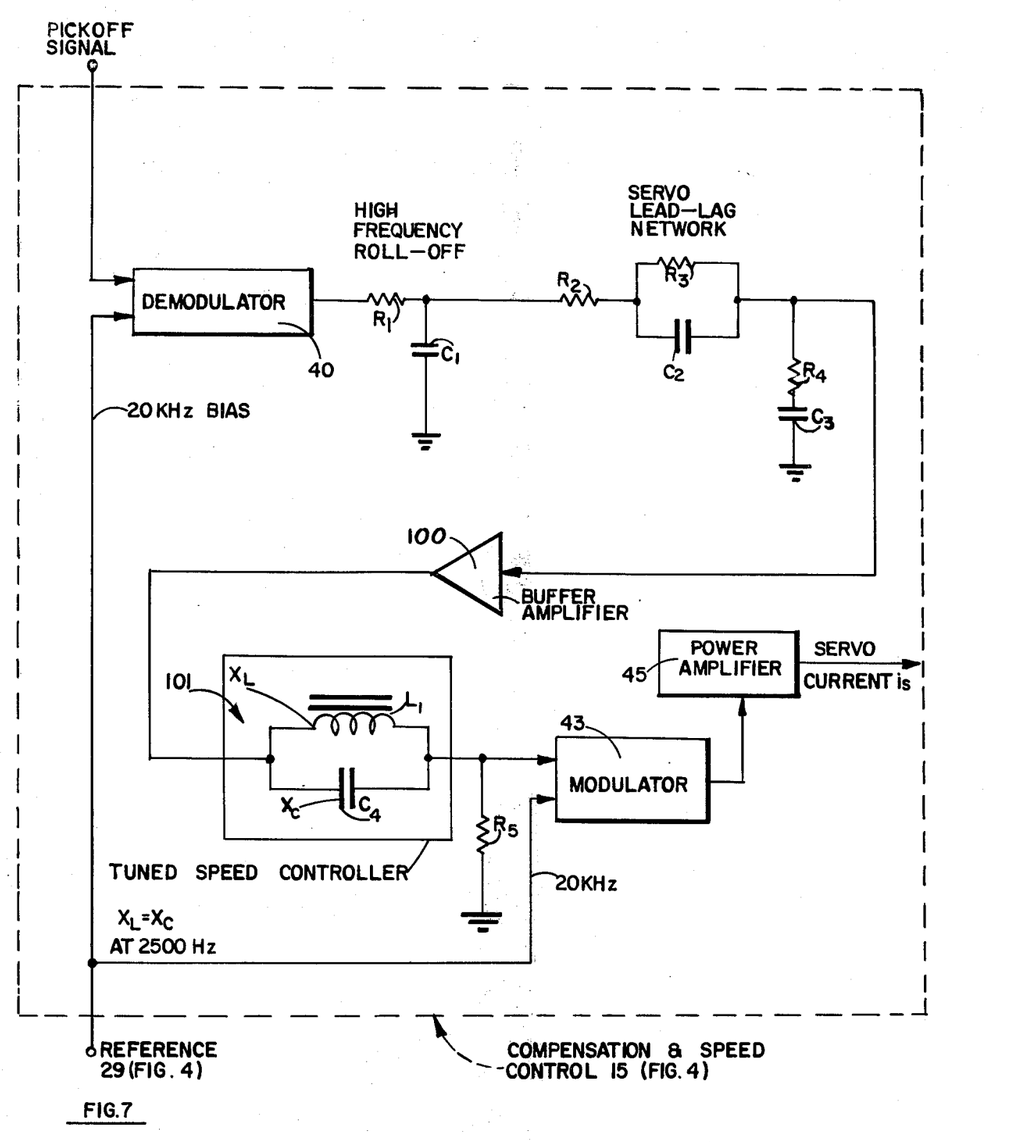
FIG. 7 illustrates in block diagram form the speed control circuit which is part of the rotor levitation circuit of FIG. 4.

Referring now to FIG. 7 with reference to FIG. 4. A demodulator 40 receives the pickoff signal from the center-tap 24 of transformer 20. Demodulator 40 also receives as a reference signal the 20 KH$_z$ bias signal and in normal demodulator operation, demodulates the input pickoff signal. A high frequency roll-off circuit comprised of resistor $R_1$ and capacitor $C_1$ removes the high frequency components from the demodulator's output signal. The signal is then fed through a servo lead-lag network comprised of resistors $R_2$, $R_3$ and $R_4$, along with capacitors $C_2$ and $C_3$ to provide the servo's system with a compensation lead for purposes of stability. The output of the lead-lag network is fed to a buffer amplifier 100 and from there to the tuned speed controller means 101 which is a sharply tuned phase lag network comprised of inductor $L_1$ and capacitor $C_4$. The speed controller introduces in the levitation circuit a means for causing a sharply tuned phase lag to occur between the sinusoidal position pickoff signal at the rotor spin frequency and the electrostatic force applied to the rotor.

Figure 8:
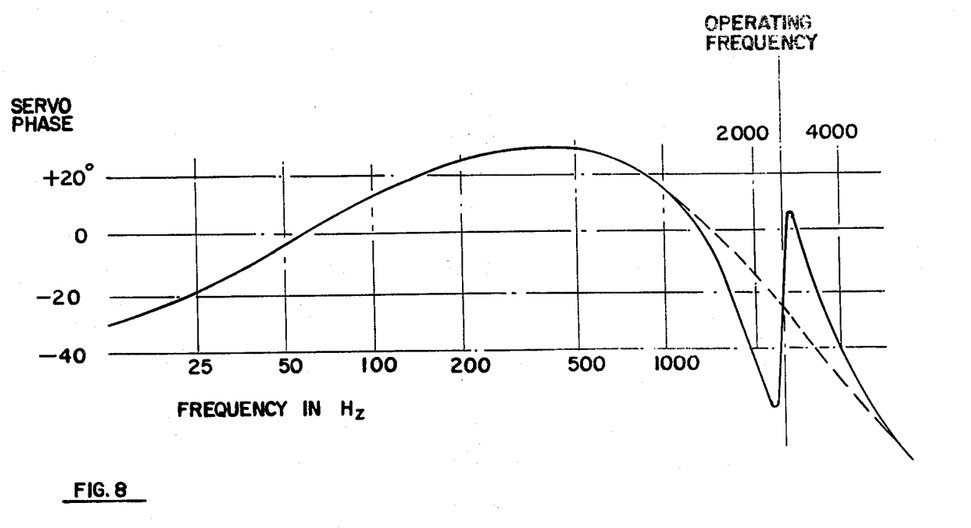
FIG. 8 is a graph showing the servo phase characteristics vs frequency for the speed control circuit of FIG. 7.
Figure 9:
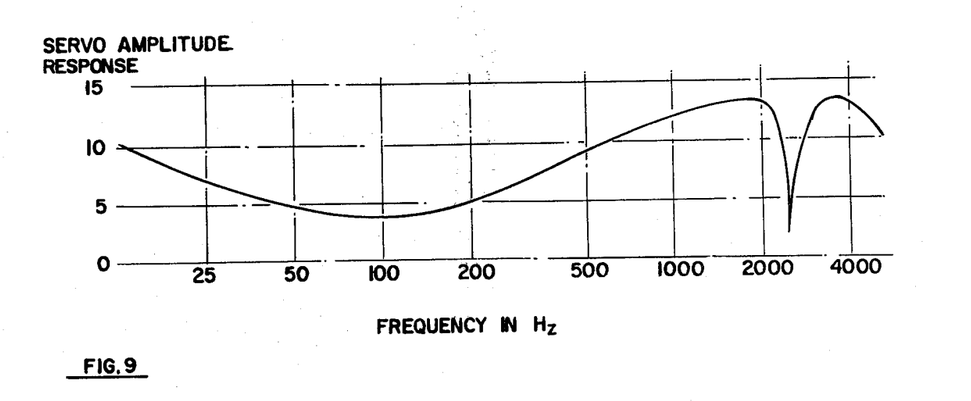
FIG. 9 illustrates the servo amplitude response for the speed control circuit of FIG. 7.

FIG. 8 illustrates the servo phase response in terms of degrees versus frequency and shows a typical response of the electronics where the speed control phase lag is shown at approximately 2,500 H$_z$ and the compensation lead at approximately 500 H$_z$. The output signal from the speed controller 101 in FIG. 7 is then fed to a modulator 43 for modulation at the 20 KH$_z$ bias rate with the modulated signal being fed to power amplifier 45 for transmittal to the transformer winding 23 and the cancellation circuit 16 of FIG. 4. The servo amplitude response versus frequency for the phase circuits used is shown in FIG. 9 with the notch occuring at approximately 2,500 H$_z$.

Figure 10A:
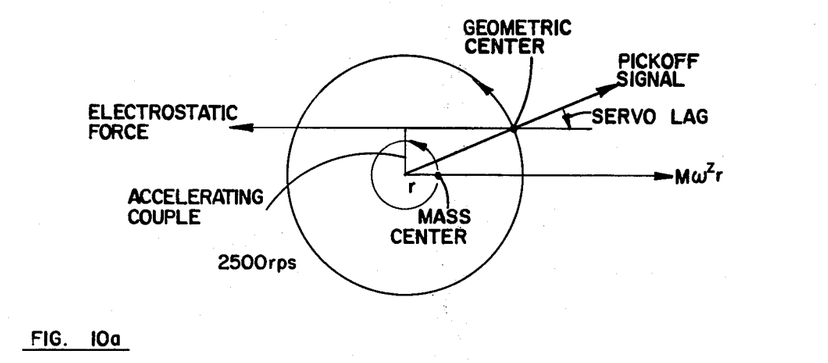
FIGS. 10a to 10c illustrate in a vector diagram form, the forces acting on the gyroscope rotor for achieving rotor speed control.

Referring to FIG. 10a which illustrates the forces acting on the ball 11 under an accelerating condition. In operation, there is a mass unbalance of the ball laterally with respect to the ball's spin axis. A moment arm, therefore, exists between the mass center of the ball and the electrostatic force vector used to levitate the ball. The electrostatic levitation force is in balance with the centrifugal force $m\omega^2 r$ but they are not in line. Speed control is, therefore, effected by the introduction of the tuned phases between the sinusoidal position pickoff signal and the electrostatic force applied to the ball at the desired spin frequency.

Figure 10B:
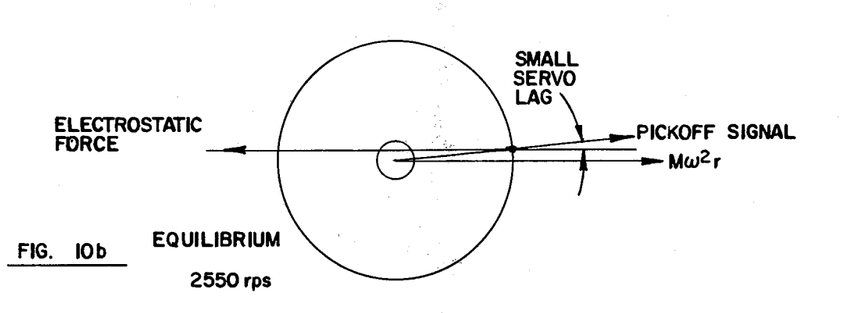

FIG. 10b illustrates the equilibrium condition where the accelerating torque applied to the ball just matches the decelerating torque due to gas and magnetic field drag.

Figure 10C:
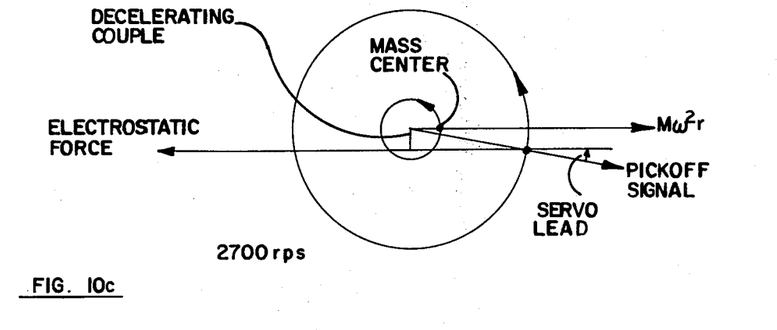

In FIG. 10c, a decelerating torque is applied through the servo lead condition created by the sharp timing of the tuned phase lag network to the mass center of the ball. The composite electrostatic levitation force vector as applied through the electrode pairs operates through the couple created by the distance between the mass center of the ball and the electrostatic force vector. If there is a shift in the phase of the lag network or the stiffness of the servo, for example, the torque balance will cause a shift to a new ball spin velocity. If such effect is undesirable in a particular application, there may be provided an external speed controller comprising a speed sensor, speed error detector, and a means for shifting the frequency at which maximum lag occurs. One means for making this shift is to shunt the capacitor $C_4$ in FIG. 7 with a small corrective capacitance inserted by means of an electronic switch.

Figure 11:
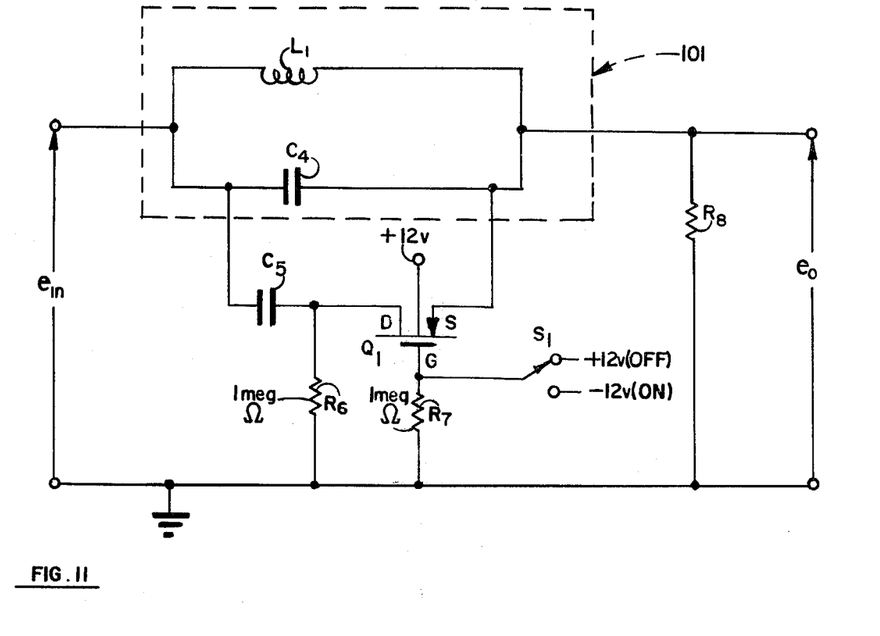
FIG. 11 illustrates a rotor speed control which is adjustable and which may be used with the embodiment illustrated in FIG. 7.

FIG. 11 shows a means for achieving rotor speed control. A switch $S_1$ allows the selection of a positive voltage or negative voltage to be applied to the gate, G, of field effect device $Q_1$. $R_7$ is a gate bias resistor. The source, S, of $Q_1$ is connected to the output end of capacitor $C_4$. The drain, D, of $Q_1$ is connected to capacitor $C_5$ which in turn is connected to the input end of capacitor $C_4$. Resistor $R_6$ is a high impedance leakage path to "drain off" any possible $Q_1$ subtract-bias leakage voltage that may tend to "collect" on $C_5$.

With a +12V applied to the gate of $Q_1$ through switch $S_1$, the $Q_1$ drain-source resistance is so high that $C_5$ is effectively not present in the lag producing circuit. With $-12$ volts applied to the gate of $Q_1$ through switch $S_1$, the device $Q_1$ is turned on and the drain-source resistance is so low that the output end of $C_5$ is effectively connected to the output end of $C_4$. This is the action of the electronic switch $Q_1$. When switch $Q_1$ is on, $C_5$ is then in parallel with $C_4$ and the total resonant circuit capacity is $C_4 + C_5$. Thus the frequency of resonance is decreased and thus the frequency of maximum lag is decreased and thus the rotor equilibrium speed is decreased due to the decrease in speed up torque.

In practice, switch $S_1$ may be replaced with an electronic speed servo such that a +12 volts is applied to the gate G of $Q_1$ when the speed is too low compared to some reference speed, and $-12V$ when speed is too high.

Figure 12:
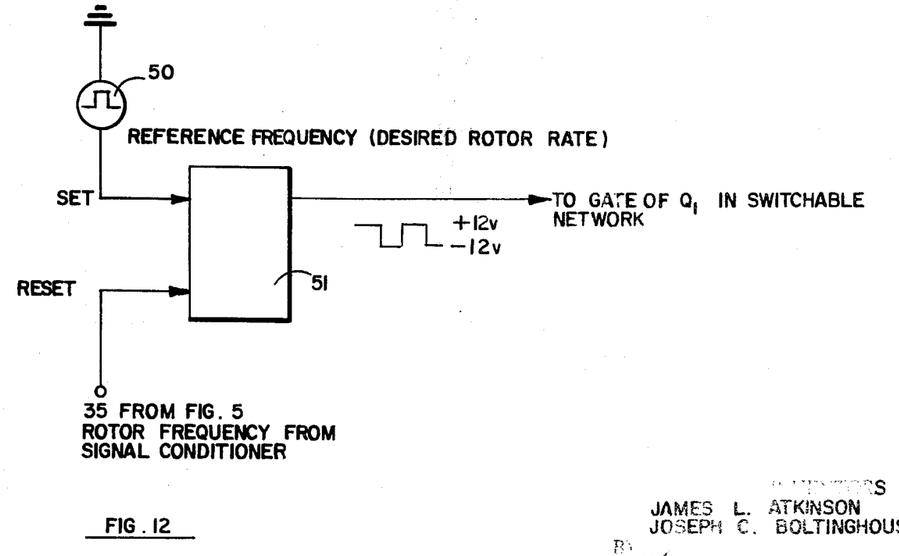
FIG. 12 illustrates a speed discriminator circuit which may be used with the switchable speed control circuit of FIG. 11.

A typical example of a speed sensor is illustrated in FIG. 12. A pulse generator 50, running at the desired rotor rate, is fed to the set input of a flip-flop 51. When a set pulse arrives at flip-flop 51 its output is brought up to +12V and is fed to gate G of the electronic switch $Q_1$ in the switchable network of FIG. 11. A reset pulse at the input of flip-flop 51 is obtained from the actual rotor rate which is further obtained from the signal conditioner output such as terminal 35 in FIG. 5. A reset pulse arriving at flip-flop 51 causes the output to drop to $-12V$. When the two rates are equal and occurring at 180° with respect to each other, the duty cycle of the output wavetrain of the flip-flop is 50%, that is, one-half the time the switch $Q_1$ is open and one-half the time the switch is closed. An average lag value is established and thus an average torque value is established. When the rotor speed value is not equal to the desired speed value, as established by the pulse generator, the duty cycle will change from 50% in such a way as to cause the average switch closure time to change the average torque value so as to drive the rotor rate toward the desired rate. The final result is to lock the phase of the rotor signal to the desired signal and hence to lock the speed of the rotor to the reference. There are many known electronic schemes which will provide speed discrimination. The above average-time switching control is one preferred example. Proportional control of a smoothly changeable lag network could also be used in place of the digital systems shown.

While there has been disclosed what is considered to be the preferred embodiment of the invention, it will be manifest that many changes and modifications may be made therein without departing from the essential spirit of the invention.

We claim:

1. A speed-controlling apparatus for an all-attitudes, electrostatically supported spinning ball gyro comprising:
    a case;
    a spinning spherical ball in said case;
    a set of spherical-surface electrostatic electrodes in the case surrounding said ball and disposed to define a plurality of levitation axes in three orthogonal axes;
    electrical servo means associated with the electrodes and being responsive to the approach of the ball toward and recession from the electrodes for adjusting the field between electrodes and ball in a manner to urge the ball toward center, the ball being so constructed as to have its center of mass displaced laterally from its spin axis so as to define a moment arm upon which a force radial to the ball can act; and
    phase lag means interposed in said servo means at substantially the frequency of desired ball speed so as to provide an accelerating moment when the ball drops below desired speed and a decelerating moment when it rises above desired speed for all attitudes of said ball with respect to said case.

2. The invention according to claim 1 further comprising:
    means operatively connected to said phase lag means for adjusting the resonant frequency of said phase lag means to achieve a desired rotational speed for said ball.

3. The invention according to claim 1 wherein said phase lag means is a parallel resonant circuit with the resonant frequency of said circuit occurring substantially at the desired ball speed.

4. A speed controlled electrostatic supported gyroscope comprising in combination:
    a case;
    a gyroscope rotor with its center of mass laterally displaced from its spin axis;
    means for levitating said gyroscope rotor with respect to said case; and
    phase lag means cooperating with said levitating means to form a resonance at the frequency of desired rotor speed so as to provide an accelerating moment to the rotor when the rotor drops below desired speed and a decelerating moment when it rises above desired speed.

5. The invention according to claim 4 and further comprising:
    means connected to said phase lag means for adjusting the frequency of resonance of said phase lag means to achieve a desired rotational speed for said rotor.

6. The invention according to claim 5 wherein said phase lag means is a parallel resonant circuit with the resonant frequency of said circuit occurring substantially at the desired rotor speed.

7. A speed controlled levitating ball gyroscope comprising:
    a case;
    a gyroscope rotor with its center of mass laterally displaced from its spin axis;
    levitating means for applying a levitating force to said gyroscope rotor to support said rotor within said case;
    means for effecting a change in the point of application of the levitating force with respect to the spin axis of said rotor so as to provide a coupling force to said gyroscope rotor which coupling force is positioned to increase the speed of said rotor when the rotor drops below a desired speed and which coupling force is positioned to decrease the rotor's speed when it rises above a desired speed.

8. The invention according to claim 7 wherein said levitating means is a closed loop electrostatic servo mechanism for attracting the gyroscope rotor towards a levitating position with respect to said case, and wherein said means for effecting a change in the point of application of the levitating force is a phase lag means interposed in the closed loop of said electrostatic servo mechanism.

9. The invention according to claim 8 wherein said phase lag means further comprises means for adjusting the frequency of resonance of said phase lag means to achieve a desired rotational speed for said rotor.

10. The invention according to claim 9 wherein said phase lag means is a parallel resonant circuit with the resonant frequency of said circuit occurring substantially at the desired rotor speed.

* * * * *

UNITED STATES PATENT AND TRADEMARK OFFICE
CERTIFICATE OF CORRECTION

PATENT NO. : 3,906,804
DATED : September 23, 1975
INVENTOR(S) : James L. Atkinson, Joseph C. Boltinghouse It is certified that error appears in the above-identified patent and that said Letters Patent are hereby corrected as shown below:

Column 3, line 37, insert -- mass -- after "because".

Column 4, line 12, change " A bis" to -- A bias --
         line 19, change " this" to -- the --
         line 49, change "Winding 24 subtracts from the Pickoff signal output appears at terminals 25, 26, 27, and 28 (FIG. 4) and the bias. Current generator furnishes an output at terminal 29."

to: -- Winding 24 subtracts from the pickoff signal output 25 any voltage due to the servo current. The levitation signal output appears at terminals 25, 26, 27, and 28 (FIG. 4) and the bias current generator furnishes an output at terminal 29. --

Signed and Sealed this twenty-ninth Day of June 1976

[SEAL]

Attest:

RUTH C. MASON
*Attesting Officer*

C. MARSHALL DANN
*Commissioner of Patents and Trademarks*